United States Patent [19]
Yang

[11] Patent Number: 5,465,802
[45] Date of Patent: Nov. 14, 1995

[54] ELECTROMOTIVE WHEEL WITH A DISENGAGEABLE STATOR

[76] Inventor: Chen-Chi Yang, P.O. Box 10780, Taipei, Taiwan

[21] Appl. No.: 260,785

[22] Filed: Jun. 16, 1994

[51] Int. Cl.⁶ ..................................................... B60K 1/00
[52] U.S. Cl. ....................................... 180/65.5; 310/67 R
[58] Field of Search ................................... 188/327, 164, 188/161; 310/67 R, 76, 77, 78, 93, 115; 180/65.5 O, 222, 907

[56] References Cited

U.S. PATENT DOCUMENTS

| | | | |
|---|---|---|---|
| 4,346,777 | 8/1982 | Restelli | 180/65.5 X |
| 5,058,016 | 10/1991 | Davidovitch | 180/65.5 X |
| 5,246,082 | 9/1993 | Alber | 180/65.5 |
| 5,263,419 | 11/1993 | Moroto et al. | 310/67 R |

*Primary Examiner*—Robert J. Oberleitner
*Assistant Examiner*—Lee W. Young
*Attorney, Agent, or Firm*—Pollock, Vande Sande & Priddy

[57] ABSTRACT

An electromotive wheel of which a rotor is attached to the wheel frame and a stator is attached on the the wheel axle. As power has been supplied, the induction electromagnetic field is induced in either the rotor or the stator. When a brake element is fixed on the wheel axle and released as the current is interrupted, then the rotor and the stator are rotated around the wheel axle by the magnetic force of the permanent magnet; but under the condition of supplying power, the brake element brakes the stator located on the wheel axle, thus the stator and rotor produce relative rotation induced from the induction electromagnetic force to drive the wheel frame.

5 Claims, 3 Drawing Sheets

ELECTROMOTIVE WHEEL WITH A DISENGAGEABLE STATOR

FIELD OF THE INVENTION

The present invention relates to an electromotive wheel, especially an actively rotative one.

BACKGROUND OF THE INVENTION

An electromotive wheel device has been provided for the handicapped person to easily move in present devices, the motor and battery are implemented on the frame of a wheelchair, and the battery current is supplied to the switch of the motor. The wheel of the wheelchair is driven by the output shaft of motor. For some electromotive wheelchairs, before driving the wheel, the speed of the output shaft of the motor is reduced by a speed reducer. In the conventional electromotive wheelchair of the prior art, when the battery power is exhausted, the wheelchair is difficult to drive, even if the power of the output shaft of motor is directly transferred to the axle of the wheel or indirectly transferred to the axle through a speed reducer.

It is recognized by those skilled in the art that the motor shaft is driven by the variation of the induction electromagnetic force formed between the stator and the rotor. As the power of the motor is interrupted, although the motor is static, the attractive force of the permanent magnetic field between the stator and the rotor inside the motor prevents the relative rotation between the stator and the rotor, so it is very difficult to drive the output shaft of motor. Because the output shaft of the electromotive wheelchair is connected to the wheel axle of the motor, the latter is difficult to rotate if the former is difficult to rotate.

It is well known by those skilled in the art the speed reducer consists of an input shaft and at least an output shaft. It is labor-saving if the output axle is driven by the input axle, however, it is difficult to drive the input axle by the output axle. If the driven structure of the electromotive wheelchair by the motor is indirectly transmitted by the speed inducer, then driving the wheelchair with a static motor is exhausted, and is often occurred in the products of which the wheel axle is driven by the motor, for example, electromotive wheelchair, electromotive motorcycle, electromotive bicycle, electromobile or the like.

If the current of the wheel axle of an electromobile is interrupted and the motor is motionless, the axle must also rotate and not be inhibited by the magnetic force of the permanent magnet inside the stator and the rotor. But this ability is either unknown by those skilled in the art, or it has been discovered but not resolved.

SUMMARY OF THE INVENTION

The object of the invention is to provide an electromotive wheel device which is driven directly by an induction electromagnetic field. The wheel is driven as the power is supplied to the electromotive device, and the wheel can rotate freely and actively.

According to the invention a stator and a rotor are installed inside the wheel, and the induction electromagnetic force is established when the power is supplied to both the stator and the rotor. The rotor is fixed on the wheel and rotates around the hollow wheel axle. The stator is engaged with the wheel axle by a bearing, and a brake element is installed on the wheel axle. A clutch switch controls the brake element in a first position or a second position. In the first position, the stator is engaged with the wheel axle and is prevented from rotating. In the second position the stator and the rotor can rotate together in the release condition, and when the wheel frame is rotated with the motor motionless, it will not be affected by the attractive force of the magnetic field between the stator and the rotor.

DESCRIPTION OF THE FIGURES

The embodiments according to the invention are described with the following figures. Those shown in the following figures are only some preferred embodiments that is not used to confine the claims described hereinafter.

DESCRIPTION OF THE PREFERRED EMBODIMENT

The method according to the invention directly drives the electromotive wheel by the induction electromagnetic force and the wheel frame to be driven easily without power, comprise the steps of: (a) installing a stator and a rotor in the wheel; (b) when the power is being supplied to either the stator or the rotor, the induction electromagnetic force is established between a first component and a second component; (c) fixing the rotor on the wheel frame rotating around the hollow wheel axle, when the peripheral of the wheel frame is used to support the tire; (d) installing a bearing element and a brake element on the wheel axle; (e) attaching the stator on the bearing element; (f) installing a clutch switch and positioning a brake element in either a first position or a second position the stator when braked by the brake element being in the first position.

Figure 1:
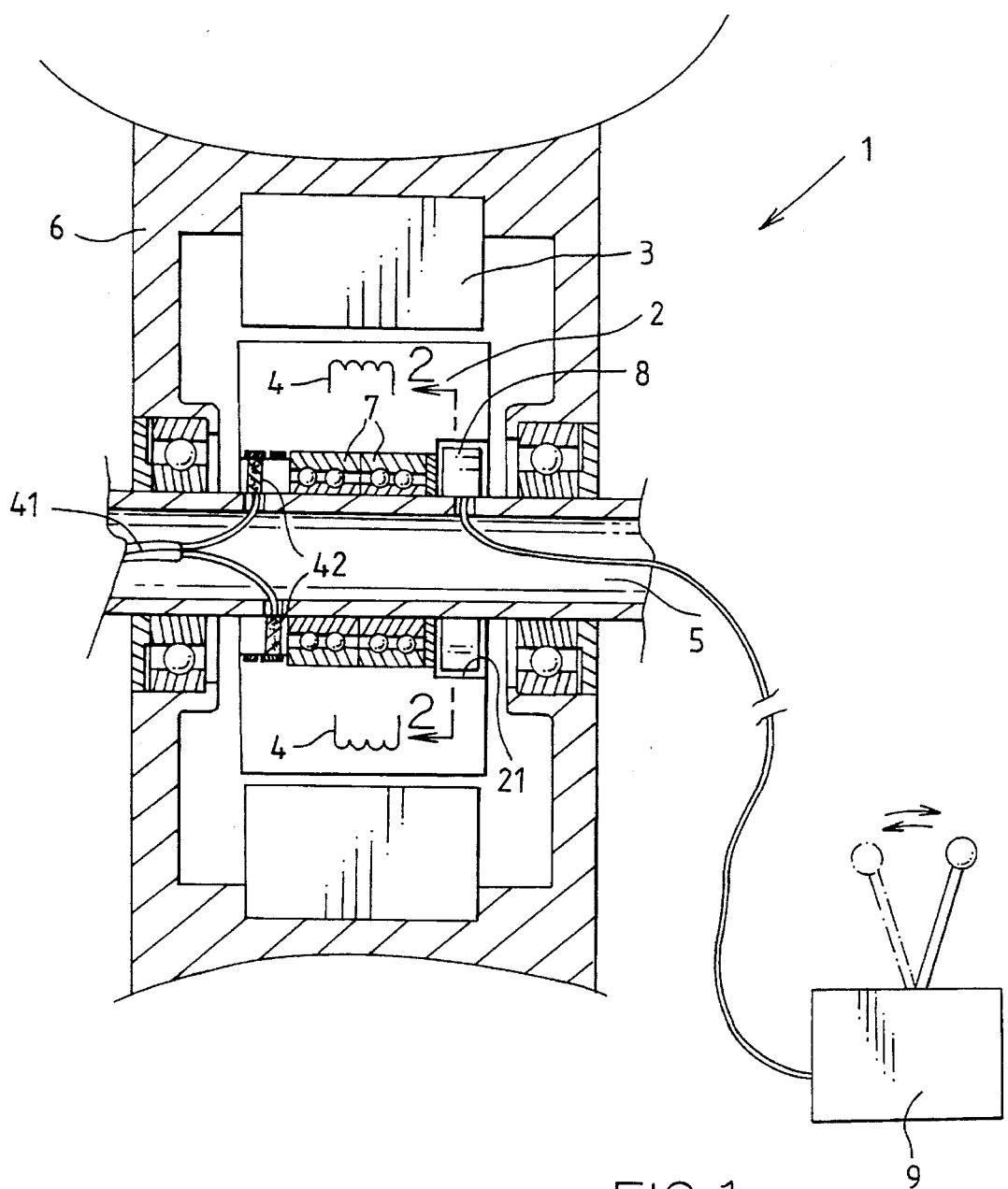
FIG. 1 is the cross section view of the invention.
Figure 2:
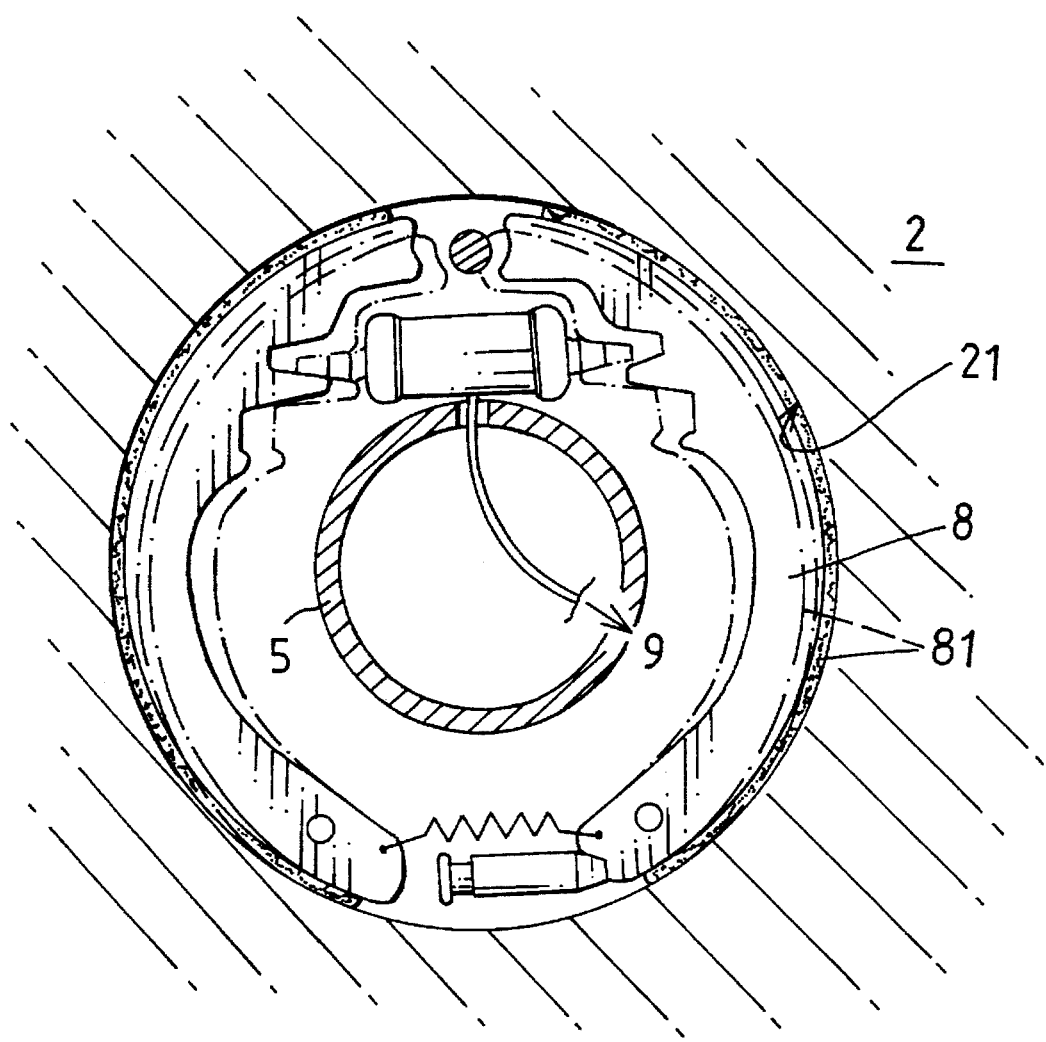
FIG. 2 shows the partial view along the line 2—2 of FIGS. 1.
Figure 3:
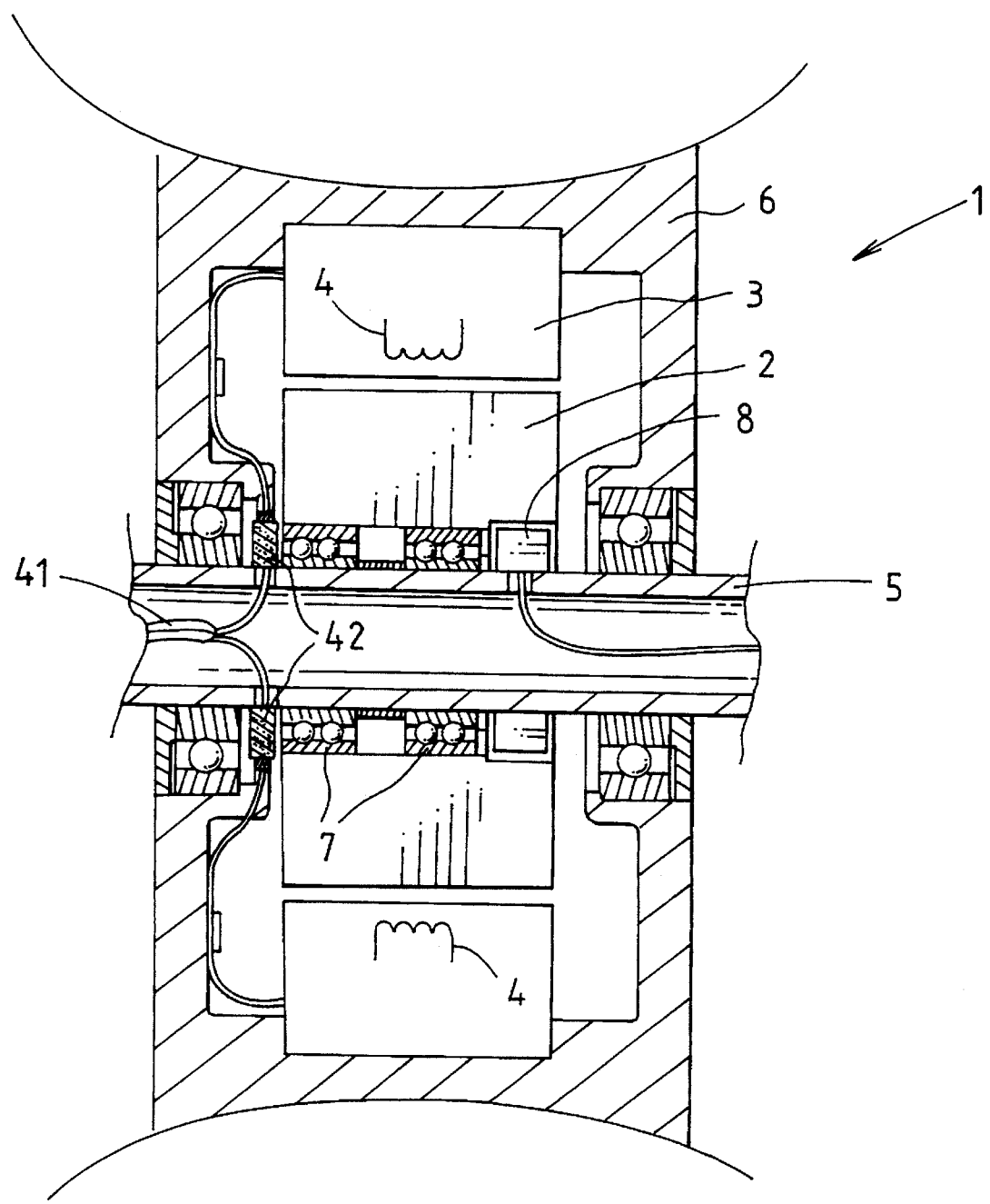
FIG. 3 shows another embodiment according to the invention, which is similar to FIGS. 1.

When the rotor is a permanent magnet, the coil winding 4 is contained in the stator; and vice versa, two examples of which are shown in the FIG. 1 and FIG. 3. The two sides of the wheel frame are attached on the wheel axle by the bearing (not designated in the figure), furthermore, the outside of the bearing is surrounded by an envelope in order to prevent pollution from dust. It is well known by those skilled in the art that in the prior art the magnetic field is formed by the permanent magnet, the electric field is produced when the current flows through the coil, and the rotor is moved by the electromagnetic force formed between the rotor and the stator. In the present invention the rotor is rotated.

The apparatus according to the present embodiment includes a rotor 3 fixed on the wheel frame, a stator 2 attached on the wheel axle inside the wheel, a current carrying coil winding existing in either the rotor or the stator and an power source 41 supplying power to the coil winding 4 for creating an induction electrical field. The object of the power source is as described before. A current is conducted by the armature 42, and the current of the coil winding is supplied from the conduction of the bearing. The two sides of the aforementioned wheel frame 6 rotating around the hollow wheel axle 5 are attached on the wheel axle 5 by the bearing. The apparatus combining the stator 2 and the wheel axle 5 includes a bearing element 7 fixed on the wheel axle 5, and the stator 2 is attached on the wheel axle 5 by the bearing element. A brake element 8 is fixed on the wheel axle, and the brake element 8 is controlled by a clutch switch 9, which is sustained in either the first position to brake the stator, or sustained in the second position to release the stator. Though the brake element shown in the figure is a brake drum the brake element may be changed to a disk brake or other elements for producing a brake element.

The characteristic of the aforementioned device is that the brake element is often sustained in the first position to tightly brake the stator 2, therefore, if the induction electromagnetic force is produced for deriving current, because being braked by the brake element 8, the stator is nonrotating which induces relative rotation of the rotor 3, so that the wheel frame 6 rotates around the wheel axle. When the current is interrupted, the brake element is released (shown in the imaginary lines of the FIGS. 1 ) by operating the clutch switch to the second position (shown in the imaginary lines of FIG. 1) and then the brake shoe 81 leaves the inner wall 21 of the stator, so that the stator and the rotor are attracted together by the attractive force of the permanent magnet. The stator is supported by the bearing element 7 and can rotate together with the rotor 3. Thus if the wheel frame is pushed, it will not be prevented from rotating by the resistance of the attractive force of the permanent magnet, i.e., the wheel frame can rotate actively on the wheel axle.

The aforementioned device forming an electromotive wheel can be used in electromotive wheelchairs, electromotive bicycles, electro mobiles and the wheels of the like. The device according to the invention can be installed directly in the wheel. When the current is interrupted it can rotate the wheel actively, so it is useless to install a driven motor as in the prior art. The conventional defect that the electro mobile is difficult to drive under the condition of no power supply has been improved. It should be understood that the alternative modifications and alternative applications about the clutch switch, brake element, and power supply by those skilled in the art are within the scope of the present invention as defined by the claims which follows.

I claim:

1. A disengageable electromotive wheel comprising:

a stator provided with a plurality of coil windings;

a coupling device for coupling said stator to a wheel axle including:

a bearing element fixed on said wheel axle, supporting said stator for rotation with respect to said wheel axle, and a brake element fixed on said wheel axle for engaging and disengaging said stator, said brake element being controlled by a clutch switch such that said brake element may be maintained in a first engaging position to brake said stator firmly preventing said stator from rotating, or in a second position to release said stator permitting said stator to rotate about said wheel axle;

a permanent magnet rotor fixedly provided inside a wheel frame of a wheel supported on said wheel axle, and facing said stator;

power supply means for supplying electric current to said coil windings of said stator so that an electromagnetic force is generated between said stator and said rotor;

said wheel frame rotating about said wheel axle by means of the electromagnetic force generated between said stator and said rotor, after said coil windings have received power supplied by said power supply means.

2. A disengageable electromotive wheel comprising:

a permanent magnet stator;

a coupling device for coupling said stator to a wheel axis including:

a bearing element fixed on said wheel axle, and connected to said stator, said bearing element and stator rotating with respect to a brake element fixed on said wheel axle, said brake element being controlled by a clutch switch into first and second positions to engage and disengage said stator, said brake element in said first position braking said stator firmly preventing said stator from rotating with respect to said axle, and said braking element in said second position releasing said stator;

a rotor fixed on a wheel frame of said wheel, said rotor being provided with a coil winding opposite said stator;

power supply means for supplying electric current to said coil winding so that an electromagnetic force is generated between said stator and said rotor rotating said frame about said wheel axle by means of the electromagnetic force generated between said stator and said rotor after said coil windings have received power supplied by said power supply means.

3. A method of employing an induction electromagnetic force to directly drive an electromotive wheel, and permitting a rotation of a wheel frame during power failure, comprising the steps of:

providing a stator and a rotor within a wheel, one of said stator or said rotor having a permanent magnet;

supplying electric currents to a coil winding on one said rotor or said rotor not having said permanent magnet so that an induction electromagnetic force is produced between said stator and said rotor;

securing said rotor in a wheel frame which may rotate around a wheel axle;

securing said wheel axle so that said wheel axle does not rotate;

providing a bearing element and a brake element on said wheel axle;

fitting said stator on said bearing element; and providing a clutch switch control for controlling said brake element such that said brake element may be maintained in a first position to brake said stator firmly with respect to said wheel axle or in a second position to release said stator and permit rotation of said stator about said wheel axle.

4. A method as claimed in claim 3, wherein said coil winding is provided on said stator and said permanent magnet is provided on said rotor.

5. A method as claimed in claim 3, wherein said coil winding is provided on said rotor and said permanent magnet is provided on said stator.

* * * * *